US012227985B2

(12) United States Patent
Düll et al.

(10) Patent No.: US 12,227,985 B2
(45) Date of Patent: Feb. 18, 2025

(54) DAMPING APPARATUS

(71) Applicant: ILLINOIS TOOL WORKS INC., Glenview, IL (US)

(72) Inventors: Florian Düll, Röttingen (DE); Christian Statt, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/989,366

(22) Filed: Nov. 17, 2022

(65) Prior Publication Data

US 2023/0160249 A1 May 25, 2023

(30) Foreign Application Priority Data

Nov. 19, 2021 (DE) ..................... 10 2021 130 287.0

(51) Int. Cl.
*E05F 5/08* (2006.01)

(52) U.S. Cl.
CPC ........... *E05F 5/08* (2013.01); *E05Y 2201/212* (2013.01); *E05Y 2900/538* (2013.01)

(58) Field of Classification Search
CPC ........ E05F 5/06; E05F 5/08; E05Y 2201/212; E05Y 2900/538; E05Y 2201/644; F16C 11/12; F16F 1/3615; F16F 1/3737; F16F 1/422; F16F 1/46; F16F 7/123
USPC ............................. 16/82, 83, 85, 86 R, 86 C
See application file for complete search history.

(56) References Cited

U.S. PATENT DOCUMENTS

| | | | | |
|---|---|---|---|---|
| 1,899,266 A * | 2/1933 | Foster | E05F 5/02 | 16/84 |
| 1,958,318 A * | 5/1934 | Selby | E05F 5/06 | 16/86 A |
| 2,149,074 A * | 2/1939 | Runkle | E05C 17/32 | 16/85 |
| 2,198,303 A * | 4/1940 | Chu | E05C 17/54 | 16/86 A |
| 2,441,455 A * | 5/1948 | Tetzman | E05F 1/10 | 16/337 |
| 2,565,442 A * | 8/1951 | Tharp | E05F 1/1066 | 16/85 |
| 2,664,590 A * | 1/1954 | Allen | E05C 17/28 | 267/176 |
| 2,673,760 A * | 3/1954 | Hawks | E05C 17/36 | 292/262 |
| 3,517,408 A * | 6/1970 | Banse | E05F 1/1066 | 16/72 |
| 3,820,866 A * | 6/1974 | Kaldenberg | F24C 15/023 | 49/386 |

(Continued)

FOREIGN PATENT DOCUMENTS

FR 2869662 A1 * 11/2005 ................ F16F 1/32

*Primary Examiner* — Jeffrey O'Brien
(74) *Attorney, Agent, or Firm* — THOMPSON HINE LLP

(57) ABSTRACT

A damping apparatus for glove compartments, includes the following: an elastic element designed so as to be stretched by a relative movement of two components that are movable in relation to one another, whereby a damping effect of the relative movement of the components is produced; a stopping apparatus designed so as to contact the elastic element during the relative movement of the two movable components and to deform such that, from the start of the contact, there results a change in the damping effect caused by the elastic element.

8 Claims, 10 Drawing Sheets

(56) References Cited

U.S. PATENT DOCUMENTS

| | | | | | |
|---|---|---|---|---|---|
| 6,076,878 | A * | 6/2000 | Isano | B60R 7/06 16/85 |
| 6,244,647 | B1 * | 6/2001 | Allison | B60R 7/06 296/37.1 |
| 6,678,918 | B2 * | 1/2004 | Nakabayashi | F16F 9/54 188/290 |
| 6,799,785 | B1 * | 10/2004 | Davis, Jr. | B60R 7/06 49/386 |
| 7,231,692 | B2 * | 6/2007 | Harada | E05F 5/10 220/835 |
| 7,234,569 | B2 * | 6/2007 | Salice | E05F 5/006 267/209 |
| 8,898,860 | B2 * | 12/2014 | Bacchetti | E05F 3/20 16/303 |
| 9,759,430 | B2 * | 9/2017 | Jadhav | F24C 15/023 |
| 9,790,725 | B2 * | 10/2017 | Leborgne | E05B 83/30 |
| 10,246,912 | B2 * | 4/2019 | Ramirez de Santiago | B60R 7/06 |
| 10,246,924 | B2 * | 4/2019 | Hopkins | E05F 5/02 |
| 10,272,854 | B2 * | 4/2019 | An | E05F 5/06 |
| 10,655,376 | B2 * | 5/2020 | Saylor | A47L 15/4261 |
| 11,124,125 | B2 * | 9/2021 | Faarup | B60R 7/06 |
| 2005/0275146 | A1 * | 12/2005 | Shin | F16F 9/54 267/226 |
| 2006/0143868 | A1 * | 7/2006 | Bauer | B60N 3/023 16/438 |
| 2009/0079203 | A1 * | 3/2009 | Huang | E05C 17/085 292/64 |
| 2023/0044666 | A1 * | 2/2023 | Park | B60R 7/06 |
| 2023/0258241 | A1 * | 8/2023 | Oomen, Jr. | F16F 15/1201 464/51 |

* cited by examiner

DAMPING APPARATUS

TECHNICAL FIELD

The present invention relates to a damping apparatus, in particular to a damping apparatus for automotive interior furnishings, such as glove compartments. Furthermore, the invention relates to an automotive interior furnishing part having a damping apparatus, in which the damping apparatus is connected to a first, fixed component and a second, movable component in order to dampen the relative movement of the two components with respect to one another. Finally, the invention relates to glove compartments and vehicles having the aforementioned damping apparatus.

BACKGROUND

For many years, it has been part of the standard of vehicles, in particular passenger cars, for a glove compartment to be mounted in the interior of the vehicle in order to store documents or other tools securely in the vehicle. The glove compartment can be cooled or closable and can have many different shapes and colors. Most glove compartments share the common feature of a flap that opens under gravity as soon as a handle is actuated.

To limit the opening speed of the flap of glove compartments, damping apparatuses are commonly provided. Without such damping apparatuses, the flap would open too quickly under gravity, i.e., fall down, which in the worst case can lead to injury of the user.

Damping apparatuses for glove compartments must be designed such that the damping effect is not linear. This is precisely because the opening forces caused by gravity are dependent on the opening angle of the flap and, accordingly, they change during the opening process. Frequently, it is the case that the opening forces are relatively low at the beginning of the movement of the glove compartment flap and grow progressively.

For the aforementioned reasons, it is known to provide damping apparatuses based on oil dampers, which can accommodate different types of oil and opening diameters in order to achieve different damping effects at different times of the opening operation. However, the known oil dampers are complicated in construction and prone to failure. Furthermore, they are difficult to adapt to different glove compartment models and relatively expensive to manufacture.

SUMMARY

Based on the aforementioned problem, the problem addressed by the present invention is to specify a damping apparatus, in particular a damping apparatus for glove compartments, that solves the disadvantages of existing solutions. In particular, the present invention specifies a damping apparatus that is easily adaptable to different types of glove compartments and has low manufacturing costs.

Accordingly, the invention relates in particular to a damping apparatus for glove compartments, comprising an elastic element designed so as to be stretched by a relative movement of two components that are movable in relation to one another, whereby a damping effect of the relative movement of the components is produced. The damping apparatus further comprises a stopping apparatus designed so as to contact the elastic element during the relative movement of the two movable components and to deform such that, from the start of the contact, there results a change in the damping effect caused by the elastic element.

By using an elastic element, for example an elastic band, instead of an oil damper, the present damping apparatus is particularly inexpensive and easy to manufacture. The components can, for example, be the housing of a glove compartment and the flap that is movable relative thereto. The elastic element can be located at any point of the kinematics between the housing and the flap, wherein a movement of the flap opposite the housing leads to a stretching of the elastic element.

With the damping apparatus according to the invention, the stopping apparatus allows two or more different damping behaviors of the elastic element to be achieved. For this purpose, the stopping apparatus and the elastic element can move relative to one another, in particular, when the two components (e.g., the flap and the glove compartment housing) perform a relative movement. In some embodiments, the stopping apparatus is initially spaced apart from the elastic element such that it can initially be stretched (in the longitudinal direction) without any influence from the stopping apparatus as soon as there is a relative movement between the flap and the housing. After such a first stretching, the elastic element and the stopping apparatus have then moved towards one another such that the stopping apparatus comes into contact with the elastic element. In a further relative movement, the stopping apparatus deforms the elastic element such that its damping effect is changed. In other words, the damping characteristic of the elastic element during the first stretching (for example, longitudinal stretching) is different (e.g., higher or lower) than is the case after contact with the stopping apparatus.

After contact between the stopping apparatus and the elastic element, the elastic element can bend over or wrap around the stopping apparatus, for example. This bending/wrapping changes the damping effect of the elastic element. For example, this bending/wrapping can increase the damping effect per stretching length so that the flap is more strongly dampened with a progressively larger opening angle.

According to another embodiment, the damping apparatus comprises a lever element having a first end and an opposite second end, wherein the elastic element is connected to the second end of the lever element. The lever element can control the stretching behavior of the elastic element. In particular, the stretching behavior of the elastic element can be determined by the direction of movement of the lever element. In some embodiments, during the first stretching, that is to say during the linear stretching of the elastic element, the lever element can have a first lever length opposite the elastic element, while the lever length is changed, for example reduced, following contact with the stopping apparatus. For example, the lever element can be connected to one of the two components, in particular to the flap of the glove compartment, and can transfer the forces generated in doing so (when opening the flap) to the elastic element in different stretching phases.

According to a further embodiment, the first end of the damping apparatus comprises the stopping apparatus. The lever element accordingly performs a dual function. On the one hand, the lever element serves to transfer the force of the components moved in relation to one another to the elastic element. On the other hand, the lever element serves as a stopping apparatus for dividing the stretching of the elastic element into two phases, namely a first phase for linear stretching and a second phase for curving of the elastic element.

According to a further embodiment, the lever element is movably borne on the first component. In other words, the lever element is connected to the first component but movable opposite thereto. For example, the lever element can be rotatably and/or translationally moveable opposite the first component. For this purpose, the lever element can comprise a guide opening, which is configured so as to receive a guide element, in particular a guide pin, of the first component, wherein the lever element is rotatably and/or translationally movable opposite to the guide element. The guide opening can, for example, be configured as an oblong hole within the lever element and can thus allow a translational movement of the guide pin between a first and a second end of the oblong hole. The lever element can thereby be moved translationally opposite the first component. At the same time, the lever element can be pivoted through the guide opening opposite the first component (in particular opposite the guide pin). By such an arrangement, the effective lever path can be continuously changed during the movement of the components relative to one another, so that even during the first and second stretching, the forces introduced into the elastic element can be changed, as will be explained in further detail below.

According to a further embodiment, the damping apparatus comprises a shaft and a collar, wherein the collar is movable relative to the shaft, and wherein the elastic element comprises a first end connected to the collar and a second end connected to the shaft. The shaft serves as a stopping apparatus. According to this embodiment, there is a stretching of the elastic element due to a relative movement between the shaft and the collar. The shaft can have a dual function in this case. In particular, it serves on the one hand as the anchor point for the elastic element. On the other hand, the shaft provides a stopping apparatus, which can be used in order to change the stretching behavior of the elastic element.

According to a further embodiment, the shaft comprises a guide groove configured so as to guide the relative movement of the collar opposite the shaft, wherein the guide groove comprises a first, linear region and a second, curved, in particular helical region. The guide groove of the shaft defines the relative movement of the collar opposite the shaft. Accordingly, the first, linear region of the guide groove serves to ensure the first, linear stretching of the elastic element. For this purpose, the collar can only be moved linearly, for example along the longitudinal axis of the shaft, thereby resulting in a linear stretching of the elastic element. As soon as the guide groove is transferred into the second, bent region, there is a rotational movement of the collar opposite the shaft, whereby the elastic element is twisted. In a helical arrangement of the bent region, there is a simultaneous twisting as well as a linear stretching of the elastic element in the second, bent region of the shaft.

BRIEF DESCRIPTION OF THE DRAWINGS

The invention is described in further detail below with reference to the drawings.

The following are shown.

DETAILED DESCRIPTION

Figure 1:
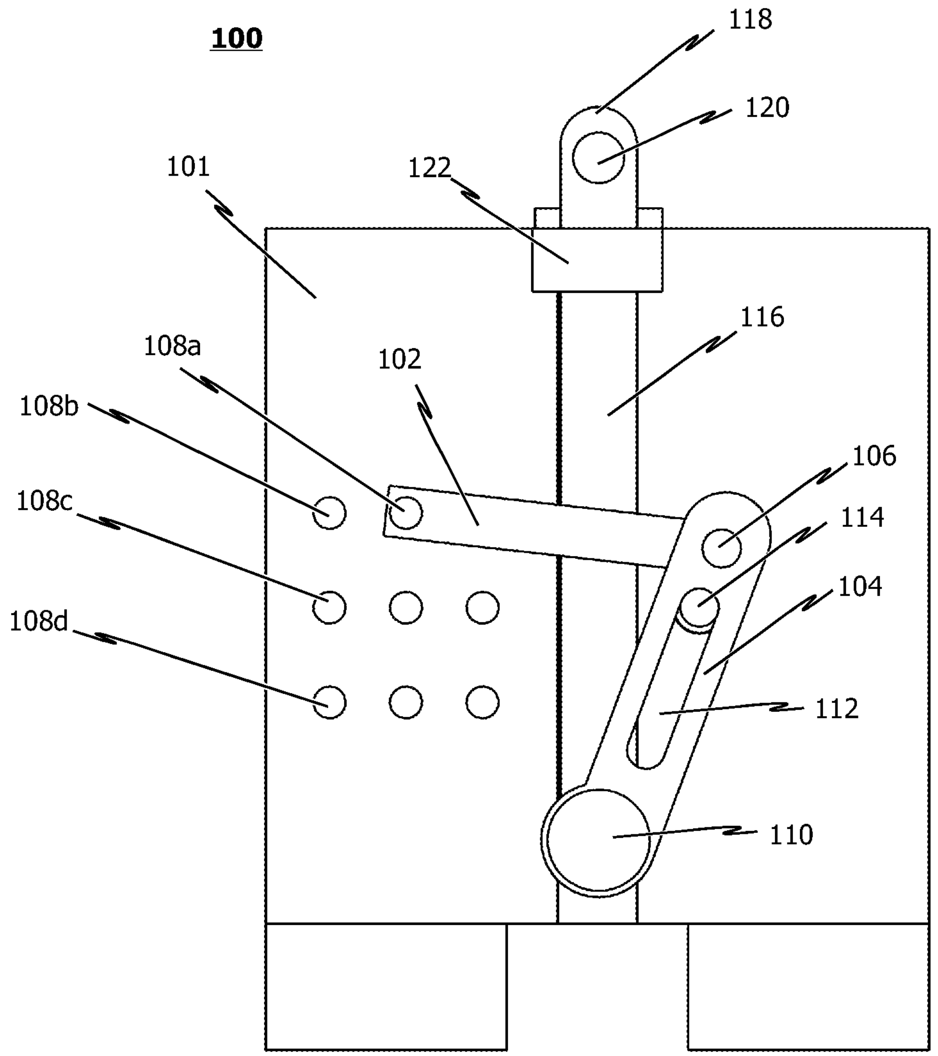
FIG. 1 a schematic view of a damping apparatus according to an embodiment of the present invention during the first stretching phase.
Figure 2:
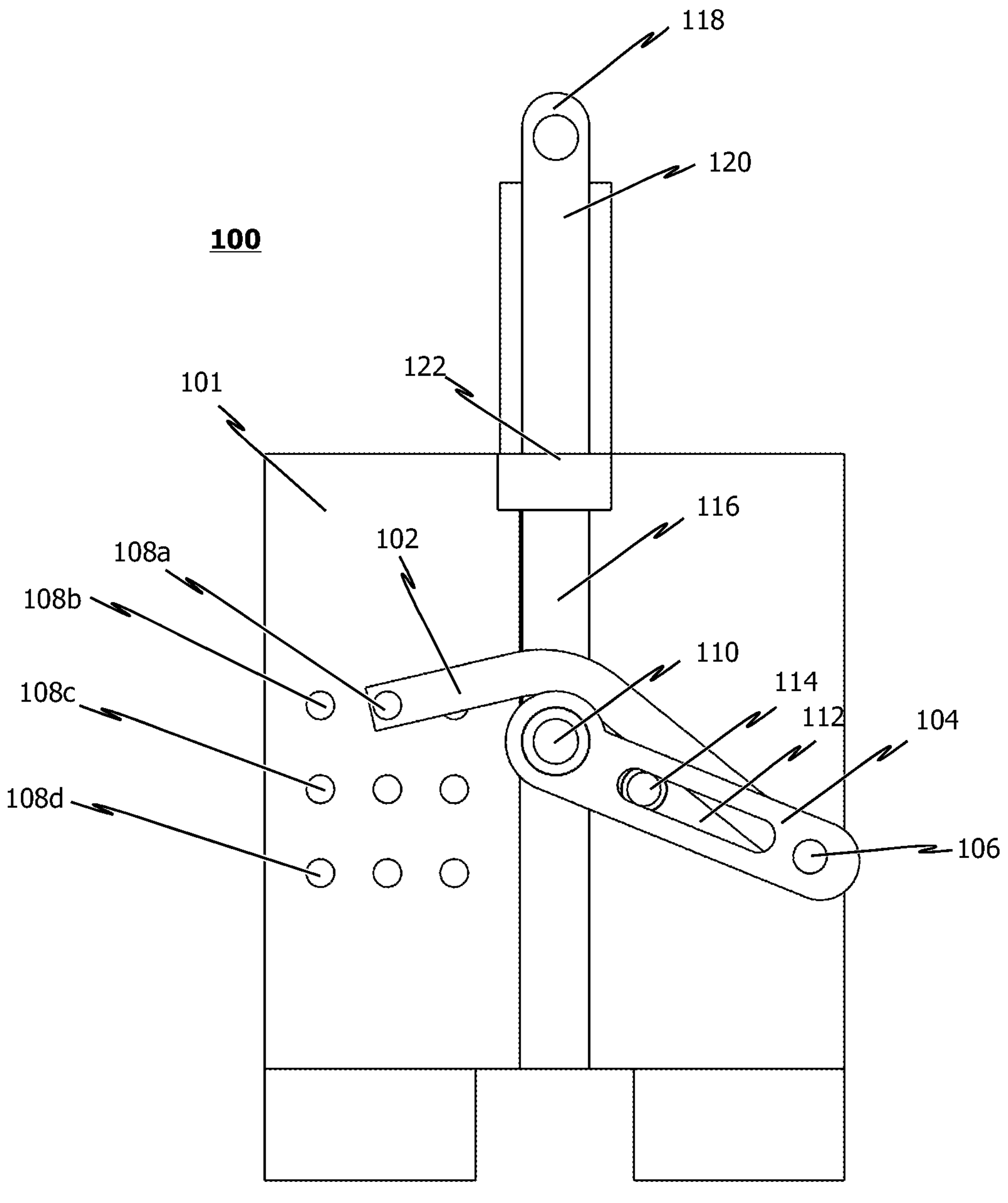
FIG. 2 the embodiment shown in FIG. 1 in a transitional phase, that is to say at the moment when the stopping apparatus contacts the elastic element.
Figure 3:
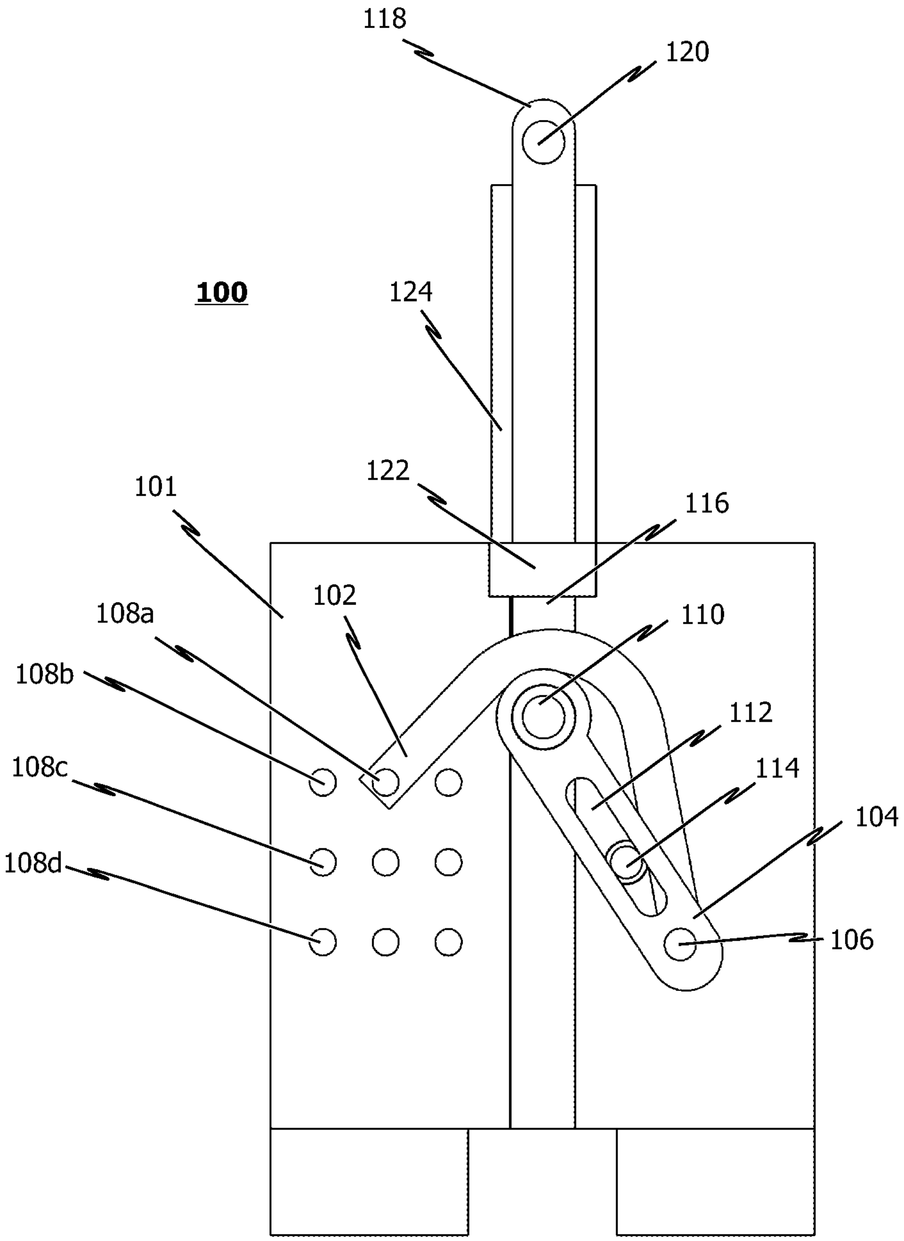
FIG. 3 a schematic view of the embodiment of FIGS. 1 and 2 in a second stretching phase, that is to say during deformation of the elastic element by the stopping apparatus.

FIGS. 1 to 3 show a first embodiment of the present damping apparatus 100. The damping apparatus 100 is shown in a home position in FIG. 1, i.e., with respect to a glove compartment, it could correspond to a closed position in which the flap is closed, i.e., abuts the housing.

In the embodiment according to FIGS. 1 to 3, a bearing apparatus 101 is shown, which, for example, is part of a housing of the damping apparatus 100 not shown herein. The bearing apparatus 101 can be connected to a first component of the vehicle (e.g., the housing of the glove compartment).

The damping apparatus 100 comprises an elastic element 102, such as a rubber band. The elastic element 102 is connected to the bearing element 101 at a first end. At an opposite second end 106, the elastic element 102 is connected to a lever element 104. In particular, the elastic element 102 can be connected to a first connecting opening 108*a* of the bearing apparatus 101 via connecting elements, such as pins, rivets, or the like. However, the elastic element can also be connected to a plurality of further fastening openings 108*b*, 108*c*, 108*d* in order to alter the stretching behavior of the elastic band 102 during the opening of the flap. Accordingly, depending on the shape and weight of the flap of the glove compartment, the first end of the elastic element 102 can be fastened to different fastening openings 108*a* to 108*d* of the bearing apparatus 101.

The lever element 104 has a first end connected to the second end of the elastic element 102. A second end of the lever element 104 opposite the first end is configured as a stopping apparatus 110, which is designed so as to contact the elastic element 102 during the movement of the first component (e.g., the glove compartment housing) and to deform such that, from the start of contact, there is a change in the damping effect caused by the elastic element 102. For this purpose, the stopping apparatus 110 is configured so as to deform the elastic element 102, as will be explained in further detail below.

In the first embodiment according to FIGS. 1 to 3, the stopping apparatus 110 is at the same time configured as a fulcrum by which the lever element 104 can be pivoted during the relative movement of the two components.

The lever element 104 comprises a guide opening 112, which, in the embodiment shown herein, is configured as an oblong hole and extends along the longitudinal direction of the lever element 104. The oblong hole 112 serves to receive a corresponding guide element 114 of the bearing apparatus 101. The guide element 114 is fixedly connected to the housing of the bearing apparatus 101 and thus to the first component (for example, the housing of the glove compartment). The lever element 104 can be moved translationally towards the guide opening 112, as well as rotationally opposite the guide element 114.

The damping apparatus according to the first embodiment further comprises a tensile element 116, in particular a pull rod. The tensile element 116 comprises a first end connected to the second end of the lever element 104. In particular, the first end of the tensile element 116 is pivotally connected to the second end of the lever element 102, for example via a rotary bearing. This rotary bearing also forms the stopping apparatus 110.

At an opposite, second end 118 of the tensile element 116, the tensile element 116 is connected to the second component (for example, the flap of the glove compartment, not shown here). For this purpose, the tensile element 116 can have a connecting opening 120 via which the second end 118 of the tensile element 116 can be connected, for example screwed, to the second component.

The tensile element 116 is guided on the bearing apparatus 101. In particular, the bearing apparatus 101 comprises a tab 122 for this purpose, which fastens the tensile element 116 to the bearing apparatus 101 such that it is only movable in the longitudinal direction of the tensile element 116 opposite the bearing apparatus 101.

In the following, with reference to FIGS. 1 to 3, the operation of the damping apparatus 100 according to the first embodiment will be explained in further detail.

As soon as there is a movement of the first component opposite the second component, i.e., the opening of the flap of a glove compartment, the tensile element 116 connected to the first component moves upwards (cf. FIGS. 1 and 2), thereby inducing a translational and rotational movement of the lever element 104. In particular, this occurs in that the tensile element 116 carries the second end of the lever element 104 configured as the stopping apparatus 110 along, namely upwards in the drawings shown herein, that is to say in the longitudinal direction of the tensile element 116. The subsequent displacement of the second end of the lever element results in the rotation of the lever element about the guide element 114 as well as a simultaneous displacement of the lever element opposite the guide element 114 along the guide opening 112 configured as an oblong hole.

The translational or rotational movement of the lever element 104 results in linear longitudinal stretching of the elastic band 102, which counteracts the movement of the tensile element 116 and thus the movement of the second component. In particular, the lever element is pivoted clockwise about the guide element 114. As a result, the elastic element is stretched, because it is stretched out of its home position shown in FIG. 1.

FIG. 2 shows a moment in which the lever element has been moved so far that the second end of the lever element configured as the stopping element 110 comes into contact with the elastic band 102. With a further movement of the tensile element 116 relative to the bearing apparatus 101 (upwards), the lever element 104 is further pivoted clockwise about the guide element 114, wherein the elastic element is now bent over the stopping apparatus 110. In other words, as soon as the stopping apparatus 110 contacts the elastic element, a second stretching phase occurs, in which the elastic element 102 is not only linearly stretched. Rather, in this second stretching phase, the elastic element 102 is bent over the stopping apparatus 110, thereby changing the stretching characteristic of the elastic element. For example, the damping apparatus 100 is designed such that the damping behavior is steeper in the second stretching phase than in the first stretching phase. In other words, in the second stretching phase, a stronger return force is achieved by the elastic element 102 per length change than was the case in the first stretching phase (linear stretching).

In summary, through the relative movement of the tensile element 116 opposite the bearing apparatus 101, a relative movement between the elastic band 102 and the second end of the lever element is achieved. The fulcrum formed as the stopping apparatus 110 between the tensile element 116 and the lever element 104 is a stopping apparatus 110 within the meaning of the present invention. This stopping apparatus 110 now contacts and deforms the elastic element 102. From this point on, the elastic element 102 has a changed stretching effect. In particular, in the exemplary embodiment of FIGS. 1 to 3, it is increased from the moment of contact between the stopping apparatus 110 and the elastic element 102.

Upon further stretching of the elastic element, it is now bent over the fulcrum (stopping apparatus 110) between the tensile element 116 and the lever element 104, so that a higher damping effect is achieved. This so-called second stretching region is shown again more clearly in FIG. 3. This position shown in FIG. 3 can be a position in which the glove compartment is fully opened.

Figure 4:
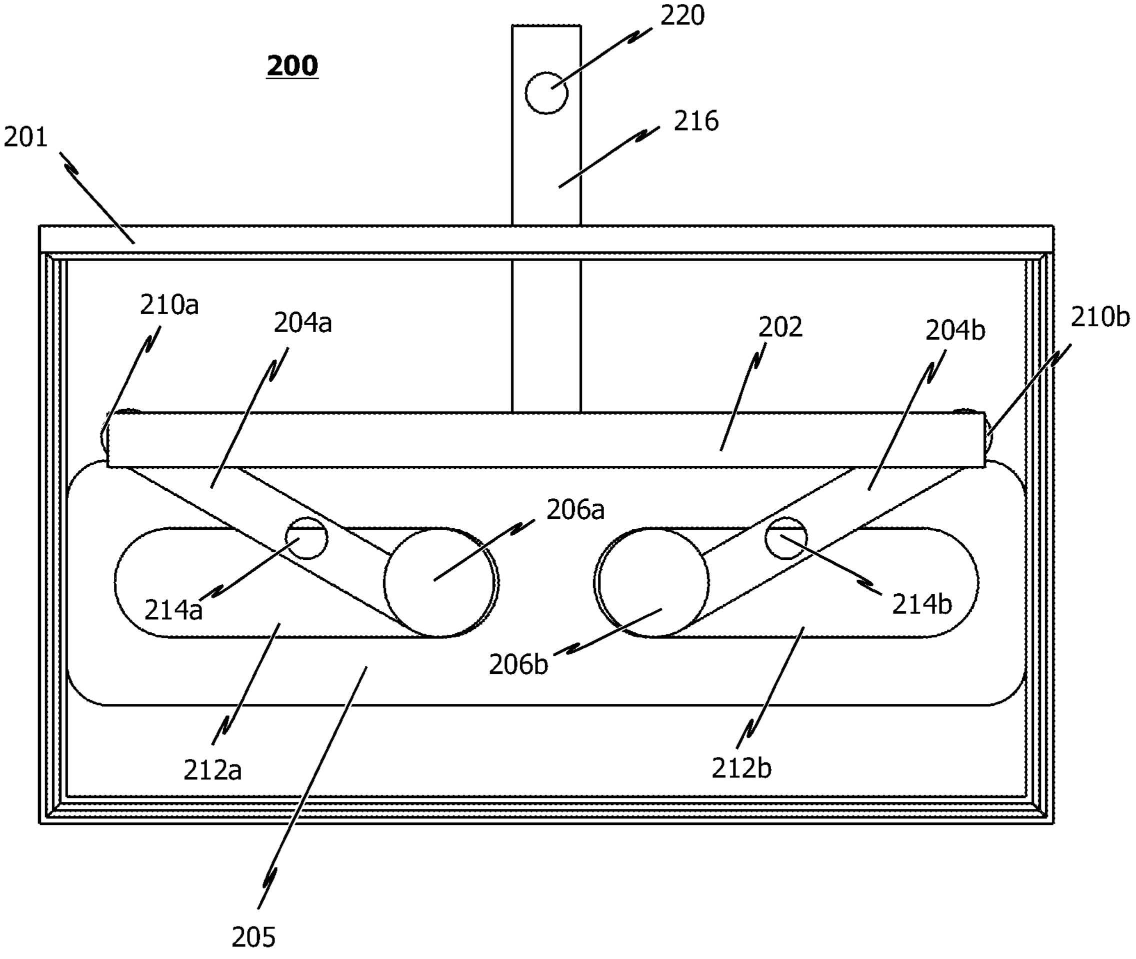
FIG. 4 a schematic view of a damping apparatus according to an embodiment of the present invention in the first damping phase.
Figure 5:
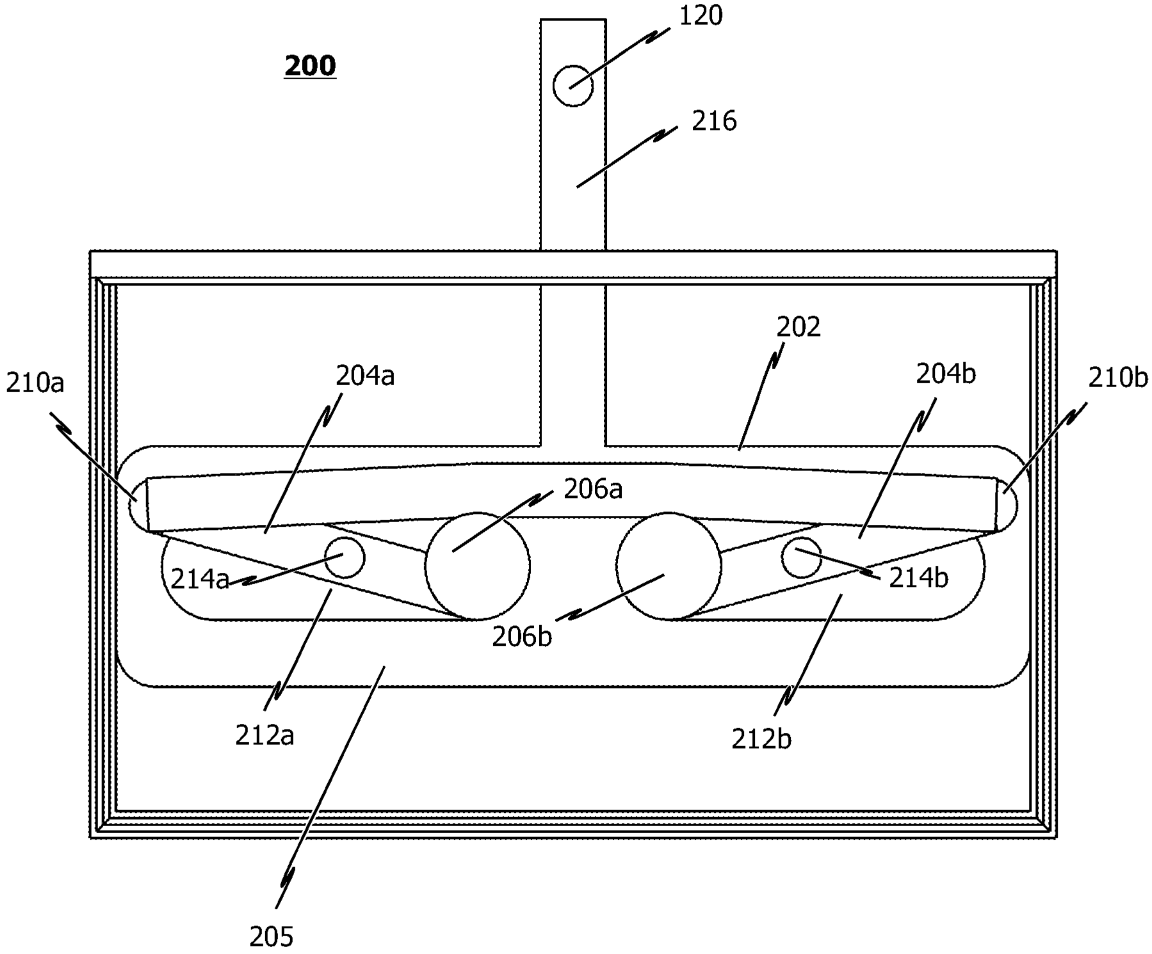
FIG. 5 a schematic view of the embodiment according to FIG. 4 in a transitional phase, that is to say at a moment when the stopping apparatus comes into contact with the elastic element.
Figure 6:
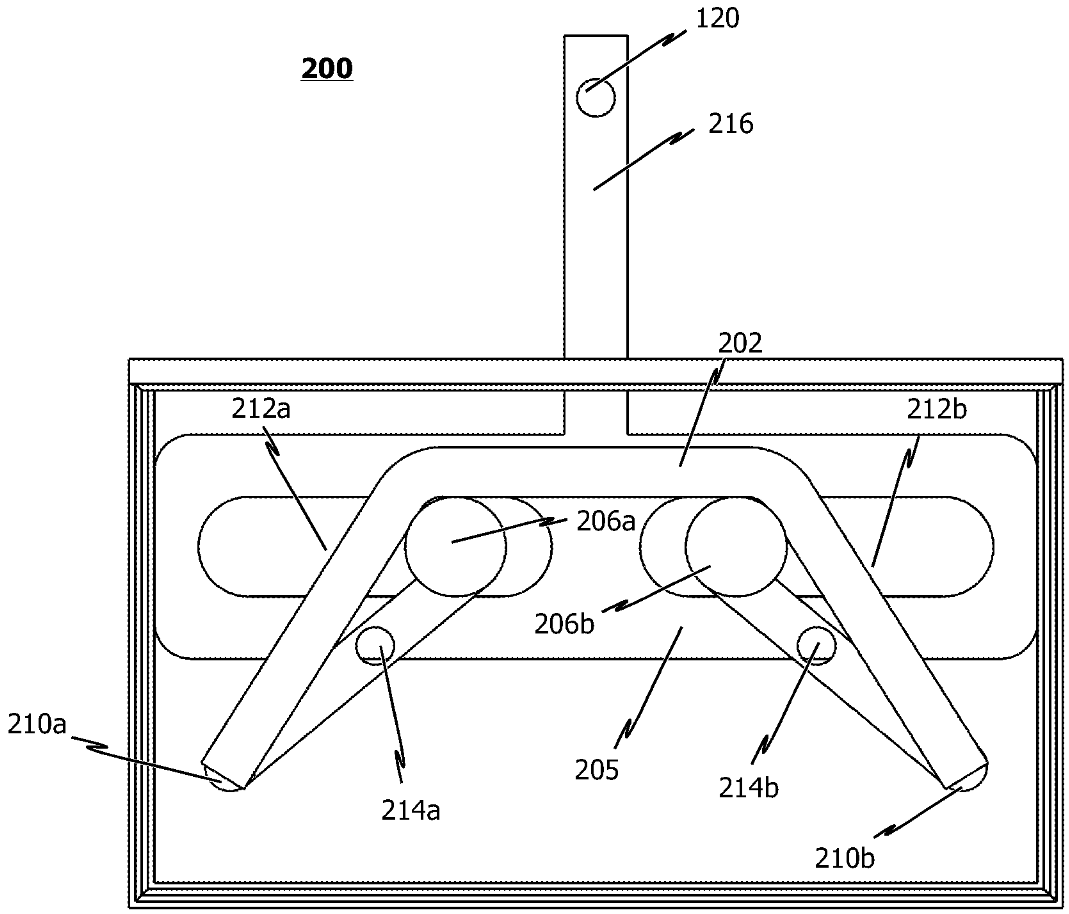
FIG. 6 a schematic view of the embodiment according to FIGS. 4 and 5 during a second stretching phase, that is to say while the elastic element is deformed by the stopping apparatus.

FIGS. 4 to 6 show a second embodiment of the damping apparatus 200 according to the invention. In this embodiment, the elastic element 102 is fastened between two lever elements 204*a*, 204*b* that lie between the two components. The damping apparatus 200 according to the second embodiment also comprises a tensile element 216, which is connected to the first component. For this purpose, the tensile element 216 comprises a fastening opening 220.

A first lever element 204*a* comprises a first end configured as a stopping apparatus 206*a*. A first end of the elastic element 202 is fastened to a second end 210*a* of the first lever element 204*a* opposite the first end. The second lever element 204*b* comprises a stopping apparatus 206*b* at its first end. A second end of the elastic element 202 is fastened to an opposing second end 210*b* of the second lever element 204*b*.

The two stopping apparatuses 206*a*, 206*b* of the lever elements 204*a*, 204*b* are at the same time configured as guide pins, which are guided in corresponding guide openings 212*a*, 212*b* of a bearing apparatus 205 connected to a tensile element 216. The guide openings 212*a*, 212*b* are each configured as oblong holes. The guide openings 212*a*, 212*b* extend substantially perpendicular to the longitudinal direction of the tensile element 216. The bearing apparatus 205 is configured integrally with the tensile element 216 and accordingly always moves together with the tensile element 216, as can be seen for example by a comparison of FIGS. 4 and 5. In other words, the bearing apparatus 205 is also movable opposite the housing 201 connected to the second component (translationally up and down, respectively).

Each of the lever elements 204*a*, 204*b* comprises through-openings 214*a*, 214*b*, in particular through-holes, that serve to rotatably fasten the lever elements to the housing 201. To this end, corresponding fastening elements (not shown), such as fastening pins, of the housing 201 are received in the through-openings 214*a*, 214*b*, about which fastening elements the lever elements 204*a*, 204*b* are rotatable. In other words, the through-openings 214*a*, 214*b* of the lever elements 204*a*, 204*b* constitute fixed rotary bearings about which the lever elements can be pivoted. The through-holes 214*a*, 214*b* do not move opposite the housing 201.

A relative movement of the glove compartment flap opposite the glove compartment housing (not shown) leads to a relative movement of the tensile element 216 opposite the housing 201. Due to this relative movement between the tensile element 116 and the housing 201, there is a rotational movement of the two lever elements 204*a*, 204*b* as shown in FIGS. 4 to 6. In particular, when the tensile element 216 is pulled out of the housing 201, the first lever element 204 is pivoted counterclockwise about the through-opening 214. At the same time, the second lever element 204*b* is pivoted clockwise about the second through-opening 214*b*.

The rotational movement of the two lever elements 204*a*, 204*b* leads to a relative movement of the second ends 210*a*, 210*b* with respect to one another. The relative movement of the two ends 210*a*, 210*b* is dampened by the elastic element 202. Two stretching regions are also provided in the embodiment shown here. In a first stretching region (FIG. 4), only a longitudinal stretching of the elastic element 202 occurs due to the rotation of the lever elements 204*a*, 204*b*. The transition to a second stretching region is shown in FIG. 5. Here, the first ends of the lever arms 204*a*, 204*b* embodied as the stopping apparatus 206*a*, 206*b* contact the elastic element 202 and further deform the elastic element 202, as shown for example in FIG. 6.

From the moment shown in FIG. 5, the second stretching region begins, in which the elastic element 202 has a second damping characteristic caused by the deformation on the part of the stopping apparatuses 206*a*, 206*b*.

Figure 7:
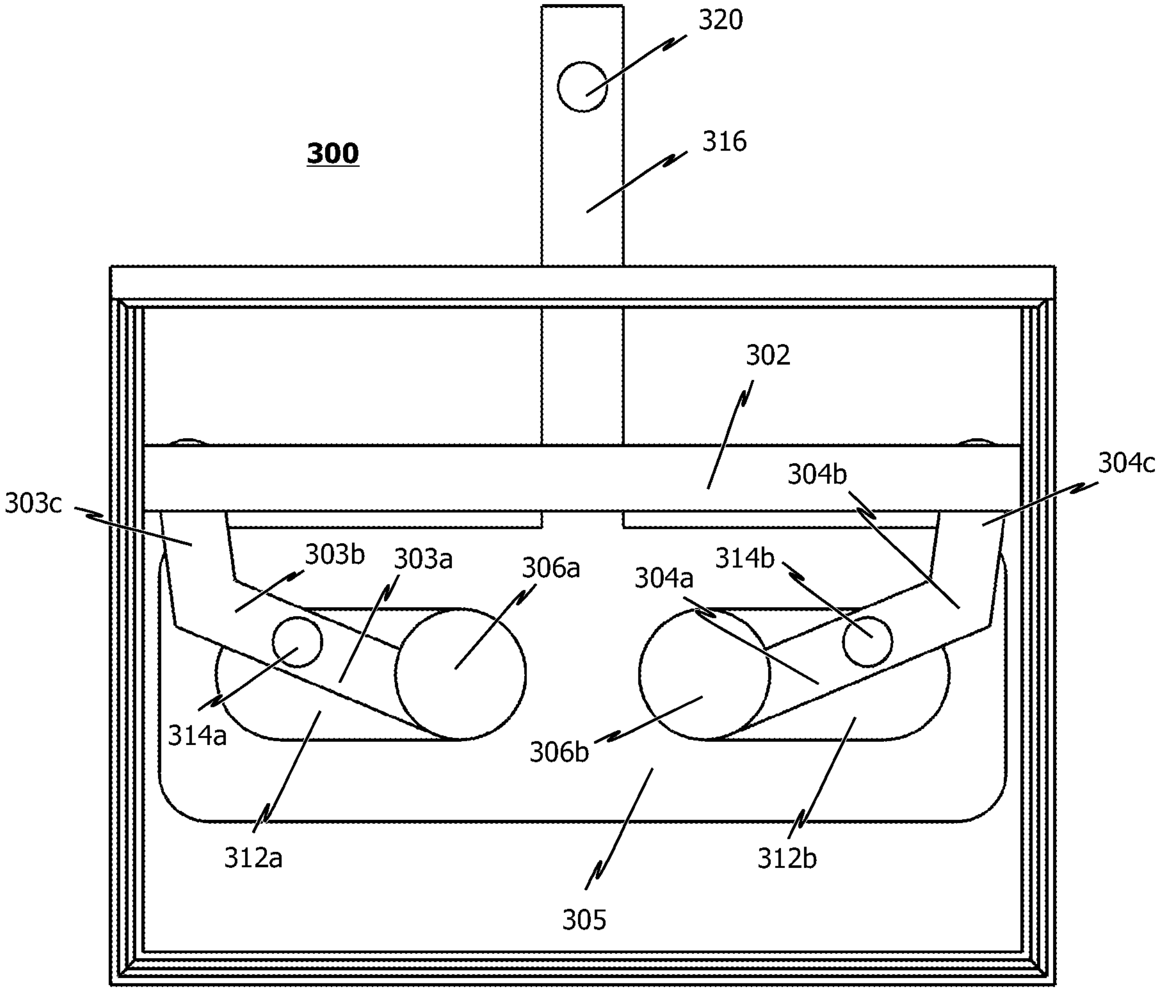
FIG. 7 a schematic view of an embodiment of the damping apparatus according to the present invention in a first stretching phase.
Figure 8:
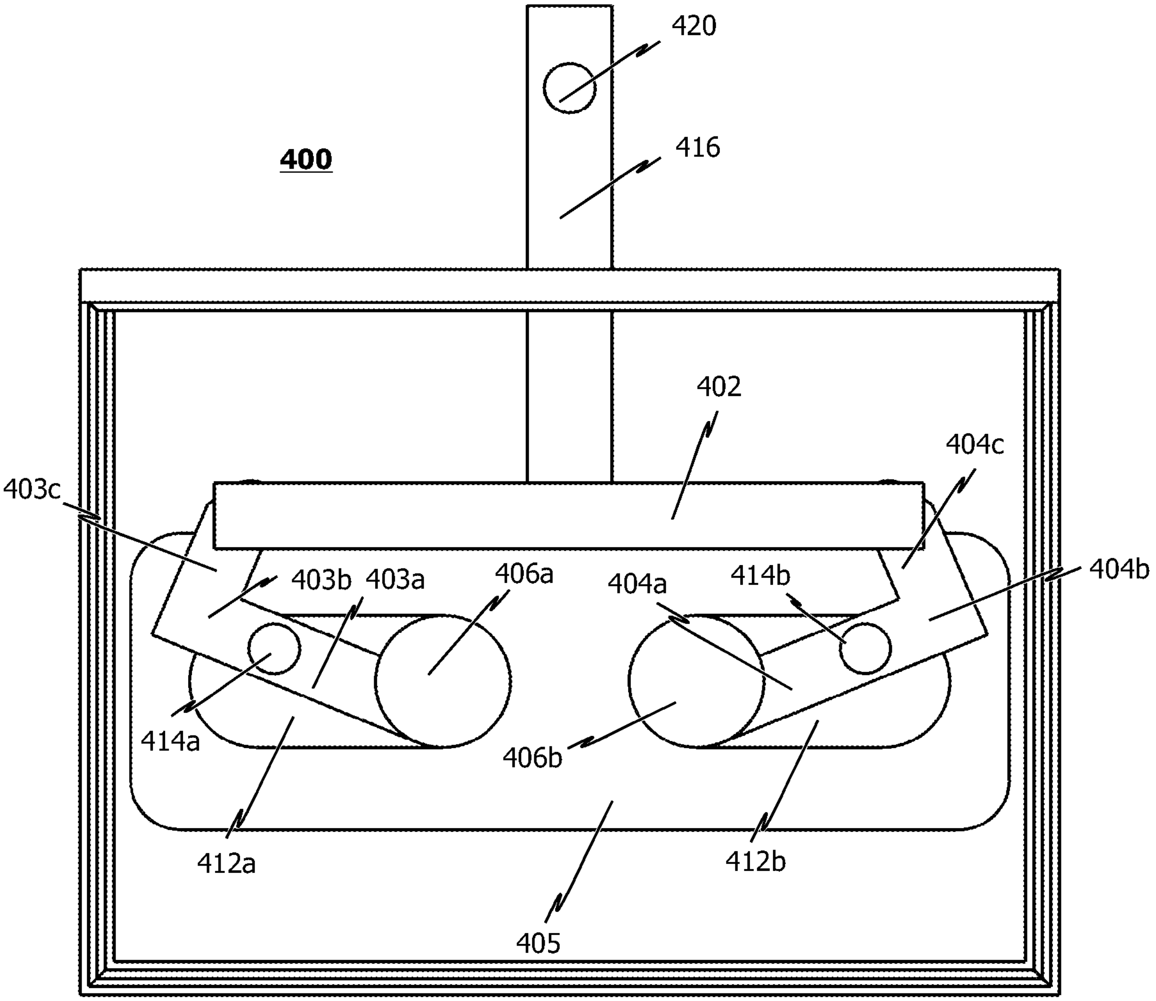
FIG. 8 a schematic view of an embodiment of the damping apparatus according to the present invention in a first damping phase.

FIGS. 7 and 8 show further embodiments of the damping apparatus 300 according to the present invention. In particular, the embodiment of the damping apparatus 300 according to FIGS. 7 and 8 corresponds to the second embodiment according to FIGS. 4 to 6. Accordingly, components of the damping apparatus 300 corresponding to components of the damping apparatus 200 have each been labeled with the same reference numerals but respectively increased by "100".

Compared to the second embodiment according to FIGS. 4 to 6, the lever elements of the damping apparatus 300 are no longer formed linearly but rather are formed in a folded manner. In particular, the first lever element comprises a first leg 303*a* which is connected at an angle between 90 and 180° to a second leg 303*c* in the transition region 303*b*. The second lever element also comprises a first leg 304*a*, which encloses an angle between 90 and 180° with a second leg 304*c* in the transition region 304*b*. Due to the changed structure of the lever elements in FIGS. 7 and 8, it is achieved that the first stretching region is longer than is the case, for example, in FIGS. 4 to 6, because the first ends of the lever arms configured as the stopping apparatus 306*a*, 306*b* only later come into contact with the elastic element.

In the embodiments according to FIGS. 1 to 8, the stopping apparatuses are each movably configured. However, this is not necessarily required, as shown by way of example in the embodiment according to FIGS. 9 and 10.

Figure 9:
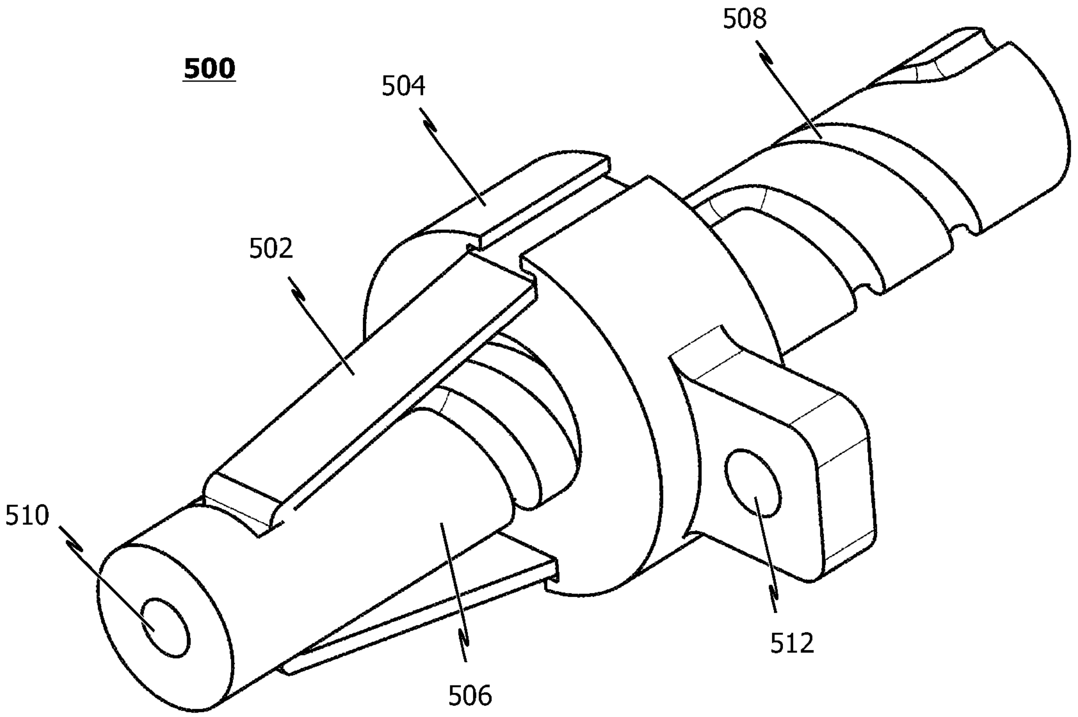
FIG. 9 a schematic view of an embodiment of the damping apparatus according to the present invention in a first stretching phase.
Figure 10:
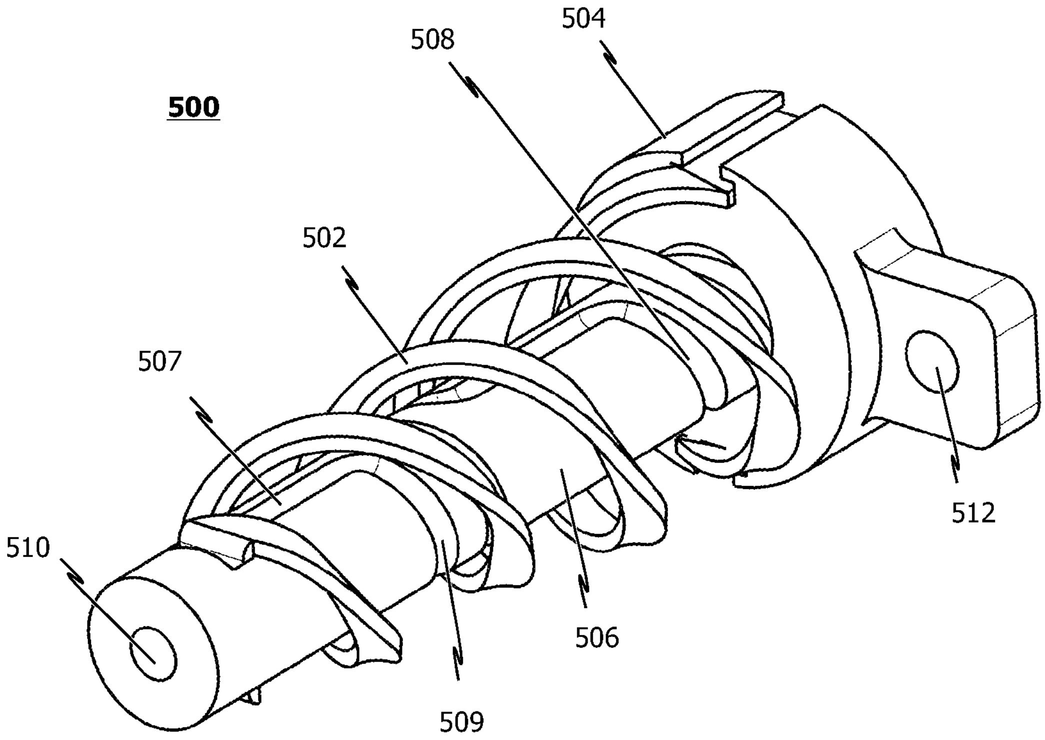
FIG. 10 a schematic view of the embodiment according to FIG. 9 in a second stretching phase.

FIGS. 9 and 10 show an embodiment of the damping apparatus 500 according to the present invention. In this embodiment, a shaft 506 having a collar 504 is shown. An elastic element 502 is arranged between the shaft 506 and the collar 504.

For example, the shaft can be connected to the first component (e.g., the glove compartment housing) while the collar is connected to the second component (for example, the glove compartment flap) via a fastening opening 512.

A relative movement of the glove compartment flap (first component) with respect to the glove compartment housing (second component) leads to a relative movement of the collar 504 opposite the shaft 506.

The collar is guided in the shown ridges or guide grooves 508 of the shaft. The guide groove 506 comprises a first, linear region 507 as well as a second, curved region 508. The linear and curved regions 507, 508 are arranged in succession, in particular.

Upon a relative movement of the collar rearwardly to the right, in the view according to FIG. 9, there is initially a linear movement of the collar 504 opposite the shaft 506, because the collar 504 is guided through the linear region 507 of the shaft 506. Accordingly, the elastic element 502 is initially stretched exclusively linearly. This corresponds to a first stretching phase. As soon as the collar 504 reaches the curved, for example spiral, portion of the guide grooves 508 or ridges, it is moved translationally rearwardly to the rear and, at the same time, moved rotationally opposite the shaft 506. The rotational movement causes the elastic element 502 to wrap around the shaft 506, as shown for example in FIG. 10. Accordingly, the shaft according to the embodiment of FIGS. 9 and 10 is a stopping apparatus that changes the stretching effect of the elastic element 502 by deformation of the elastic element 502.

In the embodiment shown in FIGS. 9 and 10, the stopping apparatus (the shaft 506) is a static element of the damping apparatus 500. Thus, only the elastic element 502 moves opposite the shaft 506 of the damping apparatus 500.

The invention is not limited to use for glove compartments. Rather, it can also be used in principle for other apparatuses in which the movement of two components relative to one another is to be dampened.

The invention is not limited to the embodiments shown in the figures, but rather results when all of the features disclosed herein are considered together.

What is claimed is:

1. A damping apparatus for glove compartments, comprising:

an elastic element configured so as to be stretched by a relative movement of first and second components that are movable in relation to one another, whereby a damping effect of the relative movement of the first and second components is produced;

a stopping apparatus configured so as to contact the elastic element during the relative movement of the first and second components causing the elastic element to deform such that, from a start of the contact, a change is produced in the damping effect caused by the elastic element;

wherein the elastic element is a rubber elastic band that is bendable and linearly stretchable, wherein a portion of the rubber elastic band that contacts the stopping apparatus is bendable and linearly stretchable.

2. The damping apparatus according to claim 1, further comprising a tensile element that is configured for movement along a linear path, wherein the stopping apparatus is connected to the tensile element for linear movement with the tensile element along the linear path.

3. The damping apparatus according to claim 1, wherein the damping apparatus is configured such that the contact of the elastic element with the stopping apparatus starts after a predetermined first stretching of the elastic element.

4. The damping apparatus according to claim 3, wherein the first stretching is a linear stretching of the elastic element.

5. The damping apparatus according to claim 3, wherein the damping apparatus is configured such that a relative movement of the first and second components in relation to one another leads to a relative movement of the elastic element about the stopping apparatus.

6. The damping apparatus according to claim 1, wherein the damping apparatus comprises a lever element having a first end and an opposite second end, wherein the elastic element is connected to the second end of the lever element.

7. The damping apparatus according to claim 6, wherein the first end of the lever element comprises the stopping apparatus.

8. The damping apparatus according to claim 6, wherein the lever element includes an oblong guide opening that receives a guide element of the first component, such that the lever element is rotatably and translationally movable about the guide element.

* * * * *